United States Patent Office 2,948,738
Patented Aug. 9, 1960

2,948,738
STEROIDS AND PROCESS FOR MAKING SAME

Tadeus Reichstein, Weissensteinstrasse 22, Basel, Switzerland; Stefan Antoni Szpilfogel, Prinses Beatrixlaan 10, Oss, Netherlands; and David Adriaan Van Dorp, Hertogin Johannasingel 17, Oss, Netherlands No Drawing. Filed Jan. 27, 1958, Ser. No. 711,163

Claims priority, application Switzerland Feb. 18, 1954

3 Claims. (Cl. 260—340.9)

This is a continuation-in-part application of our patent application Serial No. 488,426, filed February 15, 1955 (now abandoned).

This invention provides a new D-homo-androstene compound, and derivatives thereof, as well as process for manufacturing same. More particularly this invention relates to the lactone of the $\Delta^{4,16}$-11$\beta$-hydroxy-17-formyl-D-homo-androstadiene-3-one-18-acid of the formula:

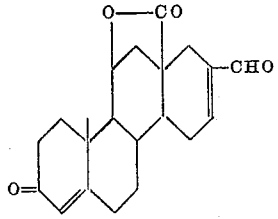

and the functional derivatives thereof. Functional derivatives are those, which are formed with aldehydic and ketonic reagents, and are readily convertible into the compound of the above formula; more particularly acetals, ketals, e.g. ethylenedioxy derivatives, mercaptals, thioketals, enol derivatives, such as enol esters, enol ethers or enamines, hydrazones, semicarbazones, thiosemicarbazones, or the like.

The lactone of the $\Delta^{4,16}$-11$\beta$-hydroxy-17-formyl-D-homoandrostadiene-3-one-18-acid, or the functional derivatives thereof are key intermediates in the preparation of therapeutically valuable compounds containing a formyl group in the 13-portion, such as aldosterone or the 17$\alpha$-hydroxylated derivative thereof, which is described in our copending application, Serial No. 711,164 concurrently filed herewith.

The new D-homo-androstene of the invention, or functional derivatives thereof may be converted into aldosterone according to the following procedure: After the D-homo-androstene compound has been converted into the 3-ethylenedioxy derivative thereof, in which the double bond in the 4-position is shifted into the 5-position, is, upon treatment of this 3-ethylenedioxy derivative of the lactone of $\Delta^{5,16}$-11$\beta$-hydroxy-17-formyl-D-homo-androstadiene-3-one-18-acid with sodium boron hydride, and esterification with benzoyl chloride, the benzoate of the lactone of this compound is formed, which is further subjected to treatment with lithium aluminium hydride and esterification with benzoyl chloride. The thus obtained dibenzoate of the 11$\beta$,18-cyclosemiacetal of $\Delta^{5,16}$-11$\beta$-hydroxy - 17 - hydroxymethyl - 18 - oxo - 3 - ethylenedioxy - D - homo - androstadiene is oxidized first with osmium tetroxide and then with periodic acid to the dibenzoate of the 2$\beta$,4$\beta$-cyclosemiacetal of 4b$\beta$-methyl-1$\beta$ - formylmethyl - 2$\beta$ - formyl-2$\alpha$(3' - hydroxy - 2' - oxopropyl) - 7 - ethylenedioxy - 1,2,3,4,4a$\alpha$,4b,5,6,7,8,10, 10a$\alpha$-dodecahydrophenanthrene-4$\beta$-ol. The formation of the latter may also be accomplished by treatment of the dibenzoate of the 11$\beta$,18-cyclosemiacetal of $\Delta^{5,16}$-11$\beta$-hydroxy-17-hydroxymethyl-18-oxo-3-ethylenedioxy-D-homo-androstadiene with ozone, then with zinc in acetic acid. The ring closure to the dibenzoate of the 11$\beta$,18-cyclosemiacetal of $\Delta^{5,16}$-11$\beta$,21-dihydroxy-18,20-dioxo-3-ethylenedioxy-pregnadiene may be accomplished by treatment with piperidine in glacial acetic acid. Hydrogenation in the presence of a palladium-carbon catalyst removes the double bond in the 16-position and upon treatment with p-toluene sulfonic acid in acetone and, subsequently, with aquous potassium hydrogen carbonate, the $\Delta^4$-11$\beta$,21-dihydroxy-3,18,20-trioxo-pregnene or aldosterone is formed.

The $\Delta^4$ - 11$\beta$,17$\alpha$,21 - trihydroxy - 3,18,20 - trioxo-pregnene may be prepared according to the process described in our copending application, Serial No. 711,164, filed concurrently herewith, for example by treating the dibenzoate of the 11$\beta$,18-cyclosemiacetal of $\Delta^{5,16}$-11$\beta$,21-dihydroxy - 18,20 - dioxo - 3 - ethylenedioxy - pregnadiene, referred to above, with hydrogen peroxide, splitting the 16,17$\alpha$-epoxide ring with hydrogen bromide and removing the bromo atom in the 16-position by treatment with Raney nickel. The thus obtained dibenzoate of the 11$\beta$,18-cyclosemiacetal of $\Delta^5$-11$\beta$,17$\alpha$,21-trihydroxy-18,20-dioxo-3-ethylenedioxy-pregnene yields the desired $\Delta^4$ - 11$\beta$,17$\alpha$,21 - trihydroxy - 3,18,20 - trioxo - pregnene by treatment with p-toluene sulfonic acid and, subsequently, with an aqueous solution of potassium hydrogen carbonate. The pregnene derivative thus obtained shows mineral corticoid properties.

The new lactone of $\Delta^{4,16}$-11$\beta$-hydroxy-17-formyl-D-homoandrostadiene-3-one-18-acid of this invention, or derivatives thereof may be prepared by treating the lactone of 4b$\beta$ - methyl - 2$\beta$ - carboxy - 1$\beta$ - formyl - methyl - 2$\alpha$-(3' - oxo - propyl) - 1,2,3,4,4a$\alpha$,4b,5,6,7,9,10,10a$\beta$ - dodecahydrophenanthrene-4$\beta$-ol-7-one or a functional derivative thereof with ring closing reagent, and, if desired, converting any resulting, functional derivative into the lactone of $\Delta^{4,16}$-11$\beta$-hydroxy-17-formyl-D-homo-androstadiene-3-one-18-acid, and/or, if desired, converting the resulting lactone of $\Delta^{4,16}$-11$\beta$-hydroxy-17-formyl-D-homo-androstadiene-3-one-18-acid into a functional derivative.

Functional derivatives of the starting material are more especially acetals or ketals, such as the 7-ethylenedioxy derivative, in which the double bond in the 8-position is shifted into the 8a-position.

A reagent suitable for bringing about the closure of the ring, is particularly a mixture of piperidine with acetic acid.

The process of the invention may be carried out with racemates or optically active compounds. The racemates may be separated into their antipodes by methods, in themselves known, e.g. by chemical or micro-biological methods.

The lactone of 4b$\beta$-methyl-2$\beta$-carboxy-1$\beta$-formylmethyl - 2$\alpha$ - (3' - oxo - propyl) - 1,2,3,4,4a$\alpha$,4b,5,6,7,9, 10,10a$\beta$-dodecahydrophenanthrene-4$\beta$-ol-7-one or a functional derivative thereof used as the starting material in the above reaction may be prepared according to the following procedure: 4b$\beta$-methyl-2-hydroxymethylene-7-ethylenedioxy - 1,2,3,4,4,a$\alpha$,4b,5,6,7,8,10,10a$\beta$ - dodecahydrophenanthrene-4$\beta$-ol-1-one, when condensed with acrolein, yields the 4b$\beta$-methyl-2$\beta$-formyl-2$\alpha$-(3'-oxo-propyl)-7 - ethylenedioxy - 1,2,3,4,4a$\alpha$,4b,5,6,7,8,10,10a$\alpha$ - dodecahydrophenanthrene-4$\beta$-ol-1-one, which is converted into its 3',3'-dimethoxy-propylacetal by treatment with methanol in the presence of hydrogen chloride. Upon oxidation with a chromium trioxide-pyridine complex, the 2$\beta$,4$\beta$-lactone of 4b$\beta$-methyl-2$\beta$-carboxy-2$\alpha$-(3',3'-dimethoxy propyl) - 7 - ethylenedioxy - 1,2,3,4,4a$\alpha$,4b,5,6,7,8, 10,10a$\beta$-dodecahydrophenanthrene-4$\beta$-ol-1-one is formed, which is reacted with lithium ethoxy-acetylene. The lactone of 4b$\beta$-methyl-1-ethoxy-ethinyl-2$\beta$-carboxy-2$\alpha$-(3',3' - dimethoxy - propyl) - 7 - ethylenedioxy - 1,2,3,4, $4a\alpha,4b,5,6,7,8,10,10a\beta$ - dodecahydrophenanthrene - $1,4\beta$-diol formed is hydrogenated in the presence of a palladium catalyst and rearranged by dehydration with a solution of thionyl chloride in pyridine to the lactone of $4b\beta$ - methyl - $2\beta$ - carboxy - $1,1$ - formyl - methylene - $2\alpha$ - ($3',3'$ - dimethoxypropyl) - 7 - ethylenedioxy - $1,2,3,4,4a\alpha,4b,5,6,7,8,10,10a\beta$ - dodecahydrophenanthrene - $4\beta$-ol. Treatment with catalytically activated hydrogen and splitting of the acetal with hydrogen chloride in the presence of acetone yields the lactone of $4b\beta$-methyl-$2\beta$-carboxy - $1\beta$ - formyl - methyl - $2\alpha$ - ($3'$-oxo - propyl)-7 - ethylenedioxy - $1,2,3,4,4a\alpha,4b,5,6,7,8,10,10a\beta$ - dodecahydrophenanthrene-$4\beta$-ol, which by reatment with p-toluene sulfonic acid in acetone may be converted into the lactone of $4b\beta$-methyl-$2\beta$-carboxy-$1\beta$-formylmethyl-$2\alpha$ - ($3'$ - oxo - propyl) - $1,2,3,4,4a\alpha,4b,5,6,7,9,10,10a\beta$-dodecahydrophenanthrene-$4\beta$-7-one. The starting material may also be used in the crude form without previous purification. Thus, by treating, for example, the lactone of $4b\beta$ - methyl - $2\beta$ - carboxy - $1\beta$ - formyl-methyl - $2\alpha$-$3',3'$ - dimethoxy - propyl) - 7 - ethylenedioxy - $1,2,3,4,4a\alpha,4b,5,6,7,8,10,10a\beta$ - dodecahydrophenanthrene - $4\beta$ - ol with an acetal splitting reagent, such as a hydrohalic acid, e.g. hydrogen chloride in acetone, the free aldehyde is obtained and is used without any further purification in the ring closure step.

The following examples illustrate the invention; the relationship of parts by weight to parts by volume being the same as that of the gram to the cubic centimeter.

*Example*

5 parts of the lactone of $4b\beta$-methyl-$2\beta$-carboxy-$1\beta$-formyl - methyl - $2\alpha$ - ($3',3'$ - dimethoxy - propyl) - 7-ethylenedioxy - $1,2,3,4,4a\alpha,4b,5,6,7,8,10,10a\beta$ - dodecahydrophenanthrene-$4\beta$-ol are dissolved in 250 parts by volume of dry acetone, and, after addition of 1.65 parts by volume of hydrochloric acid of 36 percent strength, stirred for 3 minutes at room temperature. The mixture is neutralized by the addition of 30 parts by volume of a 1-molar aqueous sodium hydrogen carbonate solution, diluted with 2500 parts by volume of water, and thoroughly extracted with a mixture of methylene chloride and ether (1:3). The organic layer is washed with water, dried with sodium sulfate, filtered and evaporated in vacuo to dryness. The oily residue, which is the crude lactone of $4b\beta$ - methyl - $2\beta$ - carboxy - $1\beta$ -formyl-methyl - $2\alpha$ - ($3'$- oxo-propyl) - 7 - ethylenedioxy - $1,2,3,4,4a\alpha,4b,5,6,7,8,10,10a\beta$ - dodecahydrophenanthrene-$4\beta$-ol, is dissolved in 450 parts by volume of benzene, mixed with 12 parts by volume of glacial acetic acid, and 9 parts by volume of piperidine, and boiled for 1½ hours in an atmosphere of nitrogen in an apparatus provided with a water-separator. After cooling, the solution is washed with water, sodium hydrogen carbonate, and water, dried with sodium sulfate, and evaporated under reduced pressure. The residue is dissolved in benzene, and chromatographed over 150 parts of alumina. The combined benzene eluates yield the lactone of the d,1-$\Delta^{5,16}$ - $11\beta$ - hydroxy - 3 - ethylenedioxy - 17 - formyl-D-homo-androstadiene-18-acid, which is recrystallized from a mixture of ether, and petroleum ether.

Upon treatment of 1 part of the above ketal with a solution of 0.2 part by weight of p-toluene sulfonic acid in 60 parts by volume of acetone for 12 hours at room temperature, and extraction of the reaction solution, after addition of a saturated solution of sodium chloride, with chloroform, the desired d,1-$\Delta^{4,16}$-$11\beta$-hydroxy-17-formyl-D-homo-androstadiene-3-one-18-acid may be obtained.

The lactone of $4b\beta$-methyl-$2\beta$-carboxy-$1\beta$-formyl-methyl - $2\alpha$ - ($3',3'$ - dimethoxy - propyl) - 7 - ethylenedioxy - $1,2,3,4,4a\alpha,4b,5,6,7,8,10,10a\beta$ - dodecahydrophenanthrene-$4\beta$-ol used as the starting material, may be prepared as follows:

A suspension of 100 parts of $4b\beta$-methyl-2-hydroxymethylene - 7 - ethylenedioxy - $1,2,3,4,4a\alpha,4b,5,6,7,8,10,$ $10a\beta$-dodecahydrophenanthrene-$4\beta$-ol-1-one in 300 parts by volume of dioxane is mixed at room temperature with 75 parts by volume of freshly distilled acrolein, to which 0.125 part of hydroquinone has been added. The reaction mixture is stirred for 7 hours at room temperature, the whole being dissolved, and the solution is allowed to stand for another 16 hours. A solution of anhydrous methanolic hydrochloric acid of 1 percent strength is cautiously added dropwise while cooling with ice and stirring, until the reaction mixture has a pH value of 7.0.

750 parts by volume of methanol are then added, the mixture is stirred for 2 hours with cooling, the crystalline precipitate is filtered off, and washed on the filter with cold methanol. In this manner there are obtained 35 parts of $4b\beta$ - methyl - $2\beta$ - formyl - $2\alpha$ - ($3'$ - oxo-propyl) - 7 - ethylenedioxy - $1,2,3,4,4a\alpha,4b,5,6,7,8,10,$ $10a\beta$-dodecahydrophenanthrene-$4\beta$-ol-1-one melting at 175–177° C., which can be further purified by recrystallization from benzene. The analytically pure product melts at 181° C.

A suspension of 20.5 parts of $4b\beta$-methyl-$2\beta$-formyl-$2\alpha$ - ($3'$ - oxo - propyl) - 7 - ethylenedioxy - $1,2,3,4,4a\alpha,$ $4b,5,6,7,8,10,10a\beta$ - dodecahydrophenanthrene - $4\beta$ - ol-1-one in 355 parts by volume of absolute methanol is gently heated on the water-bath with the exclusion of moisture, a clear solution being formed. The solution is cooled to 0° C. and 16.3 parts by volume of a solution of hydrochloric acid gas in absolute methanol containing 0.001 part of hydrochloric acid per part by volume, is added while stirring. The reaction mixture is stirred for half an hour at a temperature of 0° to +3° C., a crystalline precipitate slowly forming. The mixture is neutralized with a dilute solution of sodium methoxide in absolute methanol, the mixture is suction-filtered, and the crystals are washed with cold methanol. By recrystallization from methanol or from a mixture of benzene and methanol there is obtained the pure $4b\beta$-methyl-$2\beta$ - formyl - $2\alpha$ - ($3',3'$ - dimethoxy - propyl) - 7 - ethylenedioxy - $1,2,3,4,4a\alpha,4b,5,6,7,8,10,10a\beta$ - dodecahydrophenanthrene-$4\beta$-ol-1-one melting at 188° C.

3.5 parts of $4b\beta$-methyl-$2\beta$-formyl-$2\alpha$-($3',3'$-dimethoxypropyl)- 7 - ethylenedioxy - $1,2,3,4,4a\alpha,4b,5,6,7,8,10,$ $10a\beta$-dodecahydrophenanthrene-$4\beta$-ol-1-one are dissolved in 2 parts by volume of dry pyridine and mixed at room temperature and with stirring with a chromium trioxide-pyridine complex prepared from 3.5 parts of chromium trioxide and 10 parts of dry pyridine. The suspension is stirred for 16 hours at room temperature, diluted with 50 parts by volume of benzene, the benzene solution is washed several times with water and finally dried over sodium sulfate and evaporated to dryness in vacuo. The residue is recrystallized from methanol. There is obtained the lactone of $4b\beta$-methyl-$2\beta$-carboxy-$2\alpha$ - ($3',3'$ - dimethoxy - propyl) - 7 - ethylenedioxy-$1,2,3,4,4a\alpha,4b,5,6,7,8,10,10a\beta$ - dodecahydrophenanthrene-$4\beta$-ol-1-one in colorless crystals which melt after recrystallization from methanol at 182° C. and in the infrared spectrum show an absorption band at $5.59\mu$ characteristic of a $\gamma$-lactone group.

To 3.47 parts of clean lithium wire covered with 200 parts by volume of ether there are added slowly dropwise with stirring in a dry atmosphere of nitrogen 26.25 parts by volume of freshly distilled bromobenzene. The reaction occurs with gentle boiling. As soon as all the bromobenzene has been added, the reaction mixture is boiled under reflux gently for 1½ hours, the lithium being completely consumed. The mixture is cooled to 0° C. and slowly mixed with a solution of 19.25 parts of freshly prepared ethoxy-acetylene in 60 parts by volume of absolute benzene free from thiophene. Thereupon the lithium-ethoxy-acetylene compound precipitates in the form of a white precipitate. The reaction mixture is slowly heated to room temperature and mixed with a solution of 10.5 parts of the lactone of $4b\beta$-methyl- 2β - carboxy - 2α - (3',3' - dimethoxy - propyl) - 7 - ethylenedioxy - 1,2,3,4,4aα,4b,5,6,7,8,10,10aβ - dodecahydrophenanthrene-4β-ol-1-one in 100 parts by volume of dry benzene free from thiophene. The reaction mixture is stirred for 2 hours at room temperature under nitrogen, then poured on to 1000 parts of ice water, thoroughly shaken and the aqueous phase extracted three times with 750 parts by volume of a mixture of benzene and ether (1:1) each time. The combined organic phases are washed with water until the reaction is neutral to litmus, dried with sodium sulfate, filtered and evaporated to dryness in vacuo. The oily residue is dissolved in 45 parts by volume of ether. After being allowed to stand some time at room temperature crystals begin to precipitate. After standing for 16 hours at 6° C. crystallization is complete. The crystalline precipitate is filtered with suction and washed on the filter with a mixture of petroleum ether and ether (1:1). After recrystallization from ether there is obtained the pure lactone of 4bβ-methyl-2β-carboxy - 1β - ethoxy -ethinyl - 2α - (3',3' - dimethoxypropyl) - 7 - ethylenedioxy - 1,2,3,4,4aα,4b,5,6,7,8,10,10aβ - dodecahydrophenanthrene - 1α,4β - diol melting at 156–157° C. From the mother-liquor there is obtained by chromatography over alumina and elution with a petroleum ether ether mixture 1:1, the lactone of 4bβ-methyl - 2β - carboxy - 1α - ethoxy - ethinyl - 2α - (3',3'-dimethoxy - propyl) - 7 - ethylene - dioxy - 1,2,3,4,4aα, 4b,5,6,7,8,10,10aβ - dodecahydrophenanthrene - 1β,4β-diol, which on crystallisation from ether gives the pure compound melting at 143–144° C.

A solution of 5 parts of the lactone of 4bβ-methyl-2β-carboxy - 1β - ethoxy - ethinyl - 2α - (3',3' - dimethoxypropyl) - 7 - ethylenedioxy - 1,2,3,4,4aα,4b,5,6,7,8,10, 10aβ-dodecahydrophenanthrene-1α,4β-diol in 250 parts by volume of alcohol and 0.5 part by volume of pure pyridine is agitated in the presence of 0.25 part of a palladium calcium carbonate catalyst of 10 percent strength in an atmosphere of hydrogen at room temperature. After one molecular equivalent of hydrogen has been taken up, the reaction ceases. The mixture is filtered from the catalyst, through a thin layer of Super Cel, the filter is washed with alcohol, and the filtrate is evaporated to dryness under reduced pressure. The crystalline residue is recrystallized from a mixture of ethyl acetate and petroleum ether. The resulting lactone of 4bβ-methyl-2β-carboxy - 1β - ethoxy - vinyl - 2α - (3',3' - dimethoxypropyl) - 7 - ethylenedioxy - 1,2,3,4,4aα,4b,5,6,7,8,10, 10aβ - dodecahydrophenanthrene - 1α,4β - diol melts at 184–186° C.

A solution of 3.3 parts of the lactone of 4bβ-methyl-2β - carboxy - 1β - ethoxy - vinyl - 2α - (3',3' - dimethoxy - propyl) - 7 - ethylenedioxy - 1,2,3,4,4aα,4b,5,6,7,8, 10,10aβ - dodecahydrophenanthrene - 1α,4β - diol in 135 parts by volume of anhydrous pyridine is mixed with 38 parts by volume of a 2-molar solution of purest thionyl chloride in anhydrous pyridine at 0° C. in an atmosphere of nitrogen in the course of 2 minutes. After stirring for 15 minutes at 0° C. the reaction mixture is poured on to 700 parts by volume of a cold 0.5-molar solution of sodium hydrogen carbonate and washed with 1000 parts by volume of methylene chloride. The mixture is thoroughly agitated and the organic layer is washed with ice-cold 0.5-molar sodium hydrogen carbonate solution and with cold water, dried with sodium sulfate, and after filtration the solution is evaporated to dryness under reduced pressure. By crystallizing the residue from ether there is obtained the lactone of 4bβ-methyl-2β-carboxy-1,1 - formyl - methylene - 2α - (3',3' - dimethoxy - propyl) - 7 - ethylenedioxy - 1,2,3,4aα,4b,5,6,7,8,10,10aβ-dodecahydrophenanthrene-4β-ol melting at 206–207° C. which in the ultra-violet spectrum shows an absorption maximum at 236 mμ (log=3.85).

3.75 parts of this lactone are dissolved in 100 parts by volume of alcohol and in the presence of 1.1 parts of a palladium barium sulfate catalyst of 5 percent strength agitated at room temperature in an atmosphere of hydrogen. After 0.97 molecular equivalent of hydrogen has been taken up the reaction is interrupted. The mixture is filtered off from the catalyst and the filtrate is evaporated in vacuo. From the residue there is obtained by crystallization from a mixture of ether and petroleum ether the lactone of 4bβ-methyl-2β-carboxy-1β-formylmethyl - 2α - (3',3' - dimethoxy-propyl) - 7 - ethylenedioxy - 1,2,3,4,4aα,4b,5,6,7,8,10,10aβ - dodecahydrophenanthrene-4β-ol, melting at 188–189° C.

The lactone of the d,l-Δ$^{4,16}$-11β-hydroxy-17-formyl-D-homo-androstadiene-3-one-18-acid of this invention or a functional derivative thereof may be converted into aldosterone according to the following method: A solution of 6.2 parts of the lactone of d,l-Δ$^{5,16}$-11β-hydroxy-3-ethylenedioxy - 17 - formyl - D - homo - androstadiene - 18-acid in 200 parts by volume of alcohol is stirred for 16 hours at room temperature after the addition of 0.8 part of sodium boron hydride. By the cautious addition of 2 parts by volume of glacial acetic acid the excess of the reducing agent is destroyed, the mixture is diluted with 2000 parts by volume of water and extracted 3 times with 250 parts by volume of methylene chloride each time. The methylene chloride solution is washed with water, dried with sodium sulfate, filtered and evaporated. The dry residue is dissolved in 24 parts by volume of anhydrous pyridine and slowly mixed with 2.9 parts by volume of freshly distilled benzoyl chloride at 5° C. with stirring and the exclusion of moisture, care being taken that the temperature does not rise above 7° C. Stirring is continued for a half an hour at 5° C. and then the temperature is allowed to rise slowly to room temperature. After 16 hours the mixture is poured on to 340 parts by volume of ice water and washed with 100 parts by volume of methylene chloride. The mixture is extracted twice more with 150 parts by volume of methylene chloride each time, the extracts are washed with cold 1-molar sodium hydrogen carbonate solution, water, dilute hydrochloric acid and again with water, dried with sodium sulfate and evaporated in vacuo. The residue is dissolved in 20 parts by volume of benzene and after a short treatment with active charcoal is filtered through a small column of alumina. From the filtrate there is obtained after concentration and mixing with petroleum ether the benzoate of lactone of d,l-Δ$^{5,16}$-11β-hydroxy-3-ethylenedioxy - 17 - hydroxymethyl - D - homo - androstadiene-18-acid which is purified by crystallization from a mixture of acetone and water.

To a solution of 4.9 parts of the benzoate of lactone of d,l-Δ$^{5,16}$ - 11β - hydroxy - 3 - ethylenedioxy - 17 - hydroxymethyl - D - homo - androstadiene - 18 - acid in 27 parts by volume of tetrahydrofurane is added dropwise a solution of 0.21 part of lithium aluminum hydride in tetrahydrofurane at −15° C. with stirring. During this operation the temperature is kept below −10° C. After the reagent has been added (about 30 minutes), the reaction mixture is slowly allowed to heat up to room temperature, is cooled again to 0° C. and cautiously mixed with 10 parts by volume of acetone. About two-thirds of the solvent are now evaporated under reduced pressure, the residue is poured on to 200 parts of ice and the cold mixture is acidified with 6 parts by volume of glacial acetic acid. The mixture is rapidly extracted three times with 100 parts by volume of methylene chloride each time, the extracts are washed with water until the reaction is neutral to litmus, dried with sodium sulfate and evaporated in vacuo. The dry residue is dissolved in 13 parts by volume of anhydrous pyridine and mixed with 1.3 parts by volume of freshly distilled benzoyl chloride at 5° C. with stirring and the exclusion of moisture. The temperature is allowed to rise slowly to room temperature. After 16 hours the mixture is poured on to 200 parts by volume of ice water and washed with 50 parts by volume of methylene chloride. The mixture is extracted twice more with 100 parts by volume of methylene chloride each time, the extracts are washed with cold 1-molar sodium hydrogen carbonate solution, water, dilute hydrochloric acid and again with water, dried with sodium sulfate and evaporated in vacuo. The residue is dissolved in 20 parts by volume of benzene and after a short treatment with active charcoal is filtered through a small column of alumina. The solvent is evaporated and the crude product purified by chromatography over alumina (activity II) yields from the benzene eluates the dibenzoate of 11β,18-cyclo-semiacetal of d,l-Δ$^{5,16}$-11β-hydroxy - 17 - hydroxy - methyl - 18 - oxo - 3 - ethylenedioxy-D-homo-androstadiene, which can be purified by chromatography.

2.4 parts of this dibenzoate are dissolved in 235 parts by volume of ethyl acetate, cooled to —30° C. and a dry current of oxygen containing ozone is passed through this solution until about 1.05 molar equivalents of ozone have been consumed. 14 parts by volume of glacial acetic acid are added and 20 grams of zinc dust are added to the solution in portions while stirring. After one hour the solution is filtered off from the zinc and zinc salts and the ethyl acetate solution is washed with sodium hydrogen carbonate solution of 5 percent strength and water. After drying the ethyl acetate solution with sodium sulfate, filtering and evaporating under reduced pressure to dryness, the crude reaction product is subjected to ring closure by boiling a solution in 450 parts by volume of benzene, mixed with 12 parts by volume of glacial acetic acid and 9 parts by volume of piperidine, for one and one half hours in an atmosphere of nitrogen in an apparatus provided with a water separator. After cooling, the solution is washed with water, sodium hydrogen carbonate and water, dried over sodium sulfate and evaporated under reduced pressure. After purification by chromatography there is obtained the 18,21-dibenzoate of 11β,18-cyclosemiacetal of d,l-Δ$^{5,16}$-11β,21-dihydroxy-18,20-dioxo-3-ethylenedioxy-pregnadiene.

1 part of the compound so obtained is dissolved in 50 parts by volume of pure methanol and, after the addition of a solution of 0.01 part of potassium hydroxide in 10 parts by volume of methanol and 1 part of a 2 percent palladium-carbon catalyst, the mixture is agitated in an atmosphere of hydrogen until 1 mol of hydrogen has been taken up. The catalyst is removed by filtration, washed with methanol, the solution is neutralized by the addition of 0.01 part of glacial acetic acid and concentrated by evaporation in vacuo. The residue is taken up in chloroform, the chloroform solution is washed with water, dried with sodium sulfate and evaporated to dryness in vacuo. From the residue there is obtained by crystallization the 18,21-dibenzoate of the 11β-18-cyclosemiacetal of d,l-Δ$^5$-11β,21 - dihydroxy - 18,20-dioxo-3-ethylenedioxy-pregnene.

1 part of the dibenzoate-ketal is mixed with a solution of 0.2 part of p-toluene sulfonic acid in 60 parts by volume of acetone, and the whole is stirred overnight. After the addition of a saturated solution of sodium chloride and extracting by agitation with chloroform, the chloroform solutions are dried and evaporated, and there is obtained from the residue the 18,21-dibenzoate of the 11β,18-cyclosemiacetal of d,l-18-oxo-corticosterone.

1.2 parts of the dibenzoate are mixed with 190 parts by volume of methanol, and then a solution of 1.9 parts of potassium bicarbonate in 45 parts by volume of water is added in a current of nitrogen while stirring. The reaction solution is allowed to stand in a closed vessel under reduced pressure for 3 days at 20° C. The solution is concentrated to a considerable extent in vacuo in a current of nitrogen at a bath temperature of 40° C., and the aqueous residue is extracted with 4 portions each of 40 parts by volume of a mixture of chloroform and ether (1:3). The organic solution is washed with water, dried and evaporated. The resulting d,l-18-oxo-corticosterone or aldosterone is purified by crystallization from a mixture of acetone and ether.

Instead of reducing the double bond in the 16-position of the 11β,18-cyclosemiacetal of d,l-Δ$^{5,16}$-11β,21-dihydroxy-18,20-dioxo - 3 - ethylenedioxy - pregnadiene described hereinabove the latter may be converted as follows:

1 part of the dibenzoate of 11β,18-cyclosemiacetal of d,l-Δ$^{5,16}$-11β,21-dihydroxy - 18,20-dioxo-3 - ethylenedioxy-pregnadiene is dissolved in 180 parts by volume of methanol and treated with a solution of 0.2 part of potassium carbonate in 2 parts by volume of water and with 5 parts by volume of a hydrogen peroxide solution of 30 percent strength. The reaction mixture is allowed to stand at 0° C. for 48 hours, 2 parts of solid potassium monophosphate are then added and the mixture is concentrated at a bath temperature of 25° C. until about 20 parts by volume are left. The residue is mixed with 100 parts by volume of water and extracted with a total of 200 parts by volume of methylene chloride in 3 portions. The extracts are thoroughly washed with water, dried and evaporated.

The crude, partially saponified product thus obtained is rebenzoylated with pyridine and benzoyl chloride with the use of chloroform as diluent. The resulting dibenzoate of 11β,18-cyclosemiacetal of d,l-Δ$^5$-11β,21-dihydroxy-16,17α-oxido-18,20-dioxo - 3 - ethylenedioxy - pregnene is dissolved in 50 parts by volume of cold glacial acetic acid and mixed with 0.5 part by volume of a 32 percent solution of hydrogen bromide in glacial acetic acid. The mixture is maintained at 15° C. for 30 minutes and then poured into 500 parts by volume of ice-water containing 5 parts of potassium hydroxide. The turbid solution is extracted with a total of 500 parts by volume of methylene chloride in 3 portions and the extracts are washed with sodium bicarbonate solution and water, dried and evaporated under reduced pressure in an atmosphere of nitrogen. The residue is taken up in 35 parts by volume of ethanol of 95 percent strength and heated to 50° C. for 5 hours while stirring with 10 parts of Raney nickel catalyst. The catalyst is filtered off and the filtrate evaporated to dryness. On chromatographic purification over aluminum oxide there is obtained the pure 18,21-dibenzoate of 11β,18-cyclosemiacetal of d,l-Δ$^4$-11β,17α,21-trihydroxy-3,18,20-trioxo - pregnene. The dibenzoate thus obtained may be hydrolized as follows:

1.2 parts of the dibenzoate are mixed with 190 parts by volume of methanol, and then a solution of 1.9 parts of potassium bicarbonate in 45 parts by volume of water is added in a current of nitrogen while stirring. The reaction solution is allowed to stand in a closed vessel under reduced pressure for 3 days at 20° C. The solution is concentrated to a considerable extent in vacuo in a current of nitrogen at a bath temperature of 40° C., and the aqueous residue is extracted with 4 portions each of 40 parts by volume of a mixture of chloroform and ether (1:3). The organic solution is washed with water, dried and evaporated. The resulting d,l-Δ$^4$-11β,17α,21-trihydroxy-3,18,20-trioxopregnene or its 11β,18-cyclosemiacetal of the formulae:

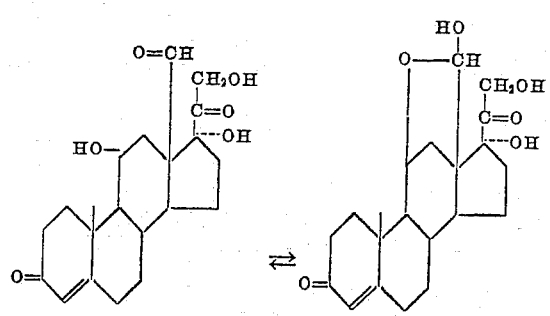

is purified by recrystallization from a mixture of acetone and ether. This compound is described in our copending patent application Serial No. 711,164, filed concurrently herewith.

What is claimed is:

1. A member of the group consisting of the lactone of $\Delta^{4,16}$-11$\beta$-hydroxy-17-formyl-D-homo-androstadiene-3-one-18-acid and the 3-ketal with lower alkylene glycol.

2. The lactone of $\Delta^{4,16}$-11$\beta$-hydroxy-17-formyl-D-homo-androstadiene-3-one-18-acid.

3. The lactone of $\Delta^{5,16}$-11$\beta$-hydroxy-3-ethylenedioxy-17-formyl-D-homo-androstadiene-18-acid.

No references cited.